(No Model.)

H. R. M. THOM.
MEASURING INSTRUMENT FOR TUNNELS.

No. 449,920. Patented Apr. 7, 1891.

Witnesses:
Jno. E. Parker
Alex. Barkoff

Inventor:
H. R. Mayo Thom
by his Attorneys
Howson & Howson

UNITED STATES PATENT OFFICE.

HUNT R. MAYO THOM, OF BALTIMORE, MARYLAND.

MEASURING-INSTRUMENT FOR TUNNELS.

SPECIFICATION forming part of Letters Patent No. 449,920, dated April 7, 1891.

Application filed August 16, 1888. Serial No. 282,868. (No model.)

*To all whom it may concern:*

Be it known that I, HUNT R. MAYO THOM, a citizen of the United States, and a resident of Baltimore, in the State of Maryland, have invented a certain Improved Measuring-Instrument for Tunnels, &c., of which the following is a specification.

The object of my invention is to construct an instrument for measuring tunnels, sewers, and like openings, by which the true circle or arch of the roof can be ascertained, and by which the usual scaffolding is dispensed with.

Figure 1:
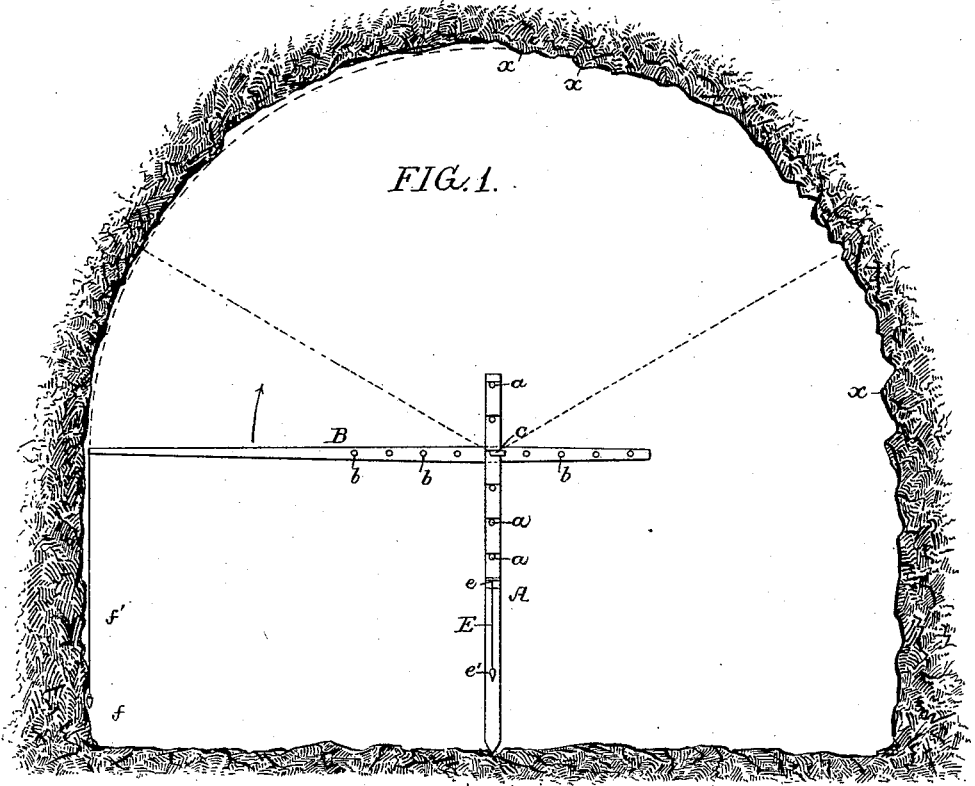
Figures 2, 3, 4, 5:
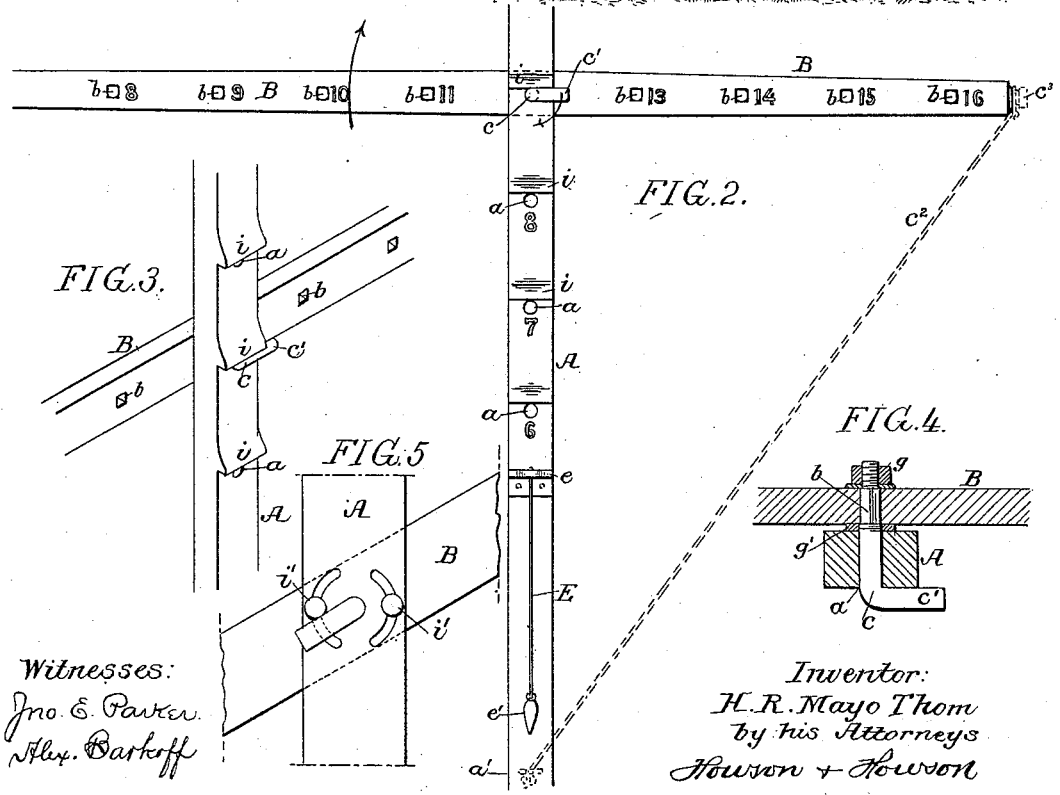

In the accompanying drawings, Figure 1 is a sectional view of a tunnel, showing my improved measuring-instrument in position. Fig. 2 is an enlarged side view of a portion of the measuring-instrument. Fig. 3 is a perspective view of the joint. Fig. 4 is a sectional view of the joint, and Fig. 5 is a view showing adjustable stops for the swinging arm.

It is customary in measuring the roofs of tunnels, sewers, and like structures to either measure them with a segment built upon trestles or like scaffolding and measure from the scaffold at different sections to see that the arch of the roof is perfect and that one part of the roof does not protrude beyond the other; but this mode of measuring is very tedious and expensive. I overcome this objection by the use of the device which I will now proceed to describe.

A is a vertical standard having pivot-holes $a$, in which rests a pivot-pin $c$, projecting from a swinging arm B, also having a number of orifices $b$, through which the pivot-pin can be passed. The orifices in the standard A and arm B, I prefer to place at a distance of a foot apart, or a fraction thereof.

The arm B is so arranged as to make a sweep in the direction of the arrow, Fig. 1, its end describing a segment of a circle, as shown by dotted lines in said figure, so that if any portion of rock or earth projects beyond the line—as, for instance, at $x$—the end of the arm will strike said projection and indicate that this portion of the channel is not sufficiently cut away. If, for instance, a tunnel is to be cut having a clearance of twenty-one feet, I so adjust the instrument that the arm will be twelve feet from the point to the center $c$, while the upright will be nine feet from the center $c$ to the ground.

I prefer to number the orifices $a$ so that the instrument may be readily adjusted to the height required. I have not shown orifices for fractions of feet, as this would only complicate the drawings.

I secure to a bracket $e$ on the upright standard A a plumb-bob $e'$, hung by a plumb-cord E, and this plummet will indicate when the standard A is perpendicular; or in place of the plumb-bob I may use a spirit-level secured to the standard.

I suspend from the outer end of the arm B a plummet $f$ by a cord $f'$, when the side walls of the tunnel are to be vertical or at right angles to the floor. This plumb-cord $f'$ will show at a glance whether or not any rock or earth projects beyond the required line.

When the arm B is at rest, it assumes a position at right angles to the standard A, and this is accomplished by bending the end $c'$ of the pivot $c$ so as to engage with a lip $i$ above the orifice $a$ of the standard A and attach the pivot $c$ securely to the arm B, preferably as shown in Fig. 4, by having a portion of the pivot squared and adapted to the squared orifices $b$ in the arm and clamp the arm between nuts $g$ $g'$; but it will be understood that any form of pivot may be used without departing from my invention.

It will be seen that as the end $c'$ of the pivot is carried by the arm B it will move in the direction of its arrow, Fig. 2, when the arm moves in the direction of its arrow, and when the arm assumes a position diametrically opposite that shown in Fig. 2 the end portion $c'$ of the pivot will also assume a reverse position, preventing the arm from passing below a line at right angles to the standard A.

In place of the permanent lips $i$ on the standard, I may use adjustable stop-pins $i'$, as shown in Fig. 5, so that the arm B may be stopped at any degree required; or the permanent lips $i$ may be made at any angle, depending on the formation of the roof of the tunnel. In place of this extension $c'$ of the pivot-pin, I may use a cord $c^2$, as shown by dotted lines in Fig. 2, fastened at the end $c^3$ of the arm B and adjustably secured to a fastening $a'$ in the standard A, thus keeping the arm while at rest at any angle to the standard A determined by the length of the cord.

It will be understood that the arm can be raised or lowered upon the standard A by passing the pivot-pin through the different orifices $a$, or the length of the arm can be increased by passing the pivot-pin through the squared opening $b$.

I claim as my invention—

The combination of the standard A and an arm B, having a pivot-pin $c$ secured thereto and having an extension $c'$, with lips or stops on the standard A, with which the extension $c'$ of the pivot-pin engages, substantially as and for the purpose described.

In testimony whereof I have signed my named to this specification in the presence of two subscribing witnesses.

H. R. MAYO THOM.

Witnesses:
 MURRAY HANSON,
 WILLIAM H. BERRY.